(12) United States Patent
Deganis et al.

(10) Patent No.: US 7,657,467 B2
(45) Date of Patent: Feb. 2, 2010

(54) COMPUTER-BASED SYSTEM AND METHOD FOR ARRANGING ITEMS ON A PALLET

(75) Inventors: Daniel Deganis, West Chester, OH (US); Kevin Doughtery, Loveland, OH (US); Dennis Herndon, Glendale, AZ (US)

(73) Assignee: The Kroger Co., Cincinnati, OH (US)

( * ) Notice: Subject to any disclaimer, the term of this patent is extended or adjusted under 35 U.S.C. 154(b) by 469 days.

(21) Appl. No.: 11/241,723

(22) Filed: Sep. 30, 2005

(65) Prior Publication Data
US 2007/0090956 A1   Apr. 26, 2007

(51) Int. Cl.
*G06Q 10/00* (2006.01)
*G06Q 30/00* (2006.01)

(52) U.S. Cl. .......................... 705/28; 705/26
(58) Field of Classification Search .................. 705/28, 705/26; 414/273
See application file for complete search history.

(56) References Cited

U.S. PATENT DOCUMENTS

| | | | | |
|---|---|---|---|---|
| 4,218,616 A | * | 8/1980 | Loomer | 250/223 R |
| 5,168,445 A | * | 12/1992 | Kawashima et al. | 705/10 |
| 5,260,694 A | * | 11/1993 | Remahl | 340/674 |
| 5,493,107 A | * | 2/1996 | Gupta et al. | 235/383 |
| 5,844,806 A | | 12/1998 | Shibano | |
| 6,182,053 B1 | * | 1/2001 | Rauber et al. | 705/28 |
| 6,238,173 B1 | | 5/2001 | Corsini | |
| 6,418,416 B1 | * | 7/2002 | Rosenberg et al. | 705/28 |
| 6,442,530 B1 | * | 8/2002 | Miller | 705/16 |
| 6,744,436 B1 | * | 6/2004 | Chirieleison et al. | 345/427 |
| 6,871,116 B2 | | 3/2005 | Brust et al. | |
| 6,974,928 B2 | * | 12/2005 | Bloom | 209/583 |
| 7,263,500 B2 | * | 8/2007 | Deal | 705/26 |
| 2002/0194093 A1 | | 12/2002 | Chow | |
| 2004/0068504 A1 | * | 4/2004 | Gobbi et al. | 707/100 |
| 2004/0074823 A1 | | 4/2004 | Brust et al. | |
| 2005/0030160 A1 | * | 2/2005 | Goren et al. | 340/10.5 |
| 2005/0289020 A1 | * | 12/2005 | Bruns et al. | 705/28 |

OTHER PUBLICATIONS

"Product Review: Building Efficient Loads with Palletizers." Packaging Jul. 1, 1991: ABI/INFORM Global, ProQuest. Web. Sep. 24, 2009.*

* cited by examiner

*Primary Examiner*—Matthew S Gart
*Assistant Examiner*—Oluseye Iwarere
(74) *Attorney, Agent, or Firm*—Thompson Hine LLP

(57) ABSTRACT

A method for arranging items on a pallet is provided. The method comprises the steps of: identifying one or more items for inclusion on the pallet; retrieving the one or more items from a storage location; and arranging the one or more items on the pallet according to a build strategy, where the build strategy includes aisle position information within a store.

20 Claims, 2 Drawing Sheets

COMPUTER-BASED SYSTEM AND METHOD FOR ARRANGING ITEMS ON A PALLET

TECHNICAL FIELD

The present application relates generally to a system and method for arranging items on a pallet in a way that allows easy predetermined placement of the pallet at the proper aisle location within a store. The system and method may be used to allow sequential off-loading of items for easy stocking of store shelves.

BACKGROUND

Large merchandising enterprises such as regional, national or global retailers and suppliers of various goods are better able to leverage the advantages provided by their size when they are able to promote accuracy and efficiency at the individual retail outlet level. In general, a store as used herein is a physical location where transactions occur between the customer and the enterprise. Stores may be subdivided into smaller sections or departments to more effectively control and track their revenues and expenses. Examples of departments for a typical large store or what is typically called a superstore may include a men's clothing department, women's clothing department, toy department, consumer electronics department, grocery department, meat department, pharmacy department, furniture department and the like. Examples of departments within a typical grocery store can include the meat department, pharmacy department, grocery department and the like.

An enterprise can be a number or collection of stores that may be grouped by geographical or corporate characteristics, such as divisions. A division can be a subset of stores within an enterprise. Divisions may be defined by geographical location, type of store, e.g. a convenience store or a superstore, or demographics, e.g. rural, urban or suburban. Individual stores may vary in size, geographic region and consumer demographics; however, groups of stores or departments may appear virtually identical. It is difficult to promote accuracy and efficiency when dealing with a large diverse enterprise. One method of promoting accuracy and efficiency is to identify areas of commonality and to promote consistency within those areas. In particular, one area in which significant benefits may be obtained through consistency is the uniform arrangement of items on store shelves. This uniformity can result in the prearrangement of the items on pallets, i.e., palletization, in an optimized manner for delivery and sequential off-loading of the items onto the store shelves.

Inconsistent grouping of items can waste time and money. For example, it takes a significant amount of time simply to unload the items from a pallet and place the items on the appropriate store shelves. As the items are unloaded from a pallet, it is inefficient for the employee to have to move between different aisles in order to stock the items on the proper shelves. Additionally, numerous changes often occur regarding the particular items being handled by the individual stores. For example, new items are continually introduced and existing items continually moved from the aisle to an end cap and vice versa. Large amounts of time can be wasted simply trying to determine the proper aisle location for the unloaded items.

Consequently, systems that provide for the placement of items onto pallets by store item location to allow sequential off-loading of the items for easy stocking of store shelves are desirable.

SUMMARY

In one embodiment, the present invention is directed to a method for arranging items on a pallet. The method comprises the steps of identifying one or more items for inclusion on the pallet; retrieving the one or more items from a storage location; and arranging the one or more items on the pallet according to a build strategy. The build strategy includes aisle position information within a store.

In another embodiment, the present invention is directed to a method for arranging items on a pallet. The method comprises the steps of receiving an order for a store, where the order includes one or more items; retrieving store location information from a planogram for the one or more items in the order; retrieving the one or more items from a storage location; and arranging the one or more items on a pallet according to the store location information. The store location information includes aisle position information.

In yet another embodiment, the present invention is directed to a computer-based system for arranging items on a pallet. The system comprises an order generating application located on a store level application server that generates order information for the store, where the order information includes one or more items and aisle position information for the one or more items; an order adjustment application located on an enterprise level application server that makes one or more adjustments to the order information; a pallet build application located on a warehouse level application server that arranges the one or more items on a pallet using the aisle position information; and a warehouse inventory application located on an enterprise level application server for communicating the order information to the pallet build application.

These and other features, aspects and advantages of the present invention will become evident to those skilled in the art from a reading of the present disclosure.

BRIEF DESCRIPTION OF THE DRAWINGS

While the specification concludes with claims particularly pointing out and distinctly claiming the invention, it is believed that the present invention will be better understood from the following description in conjunction with the accompanying figures, in which like reference numerals identify like elements, and wherein:

DETAILED DESCRIPTION

I. System and Method Overview

Figure 1:
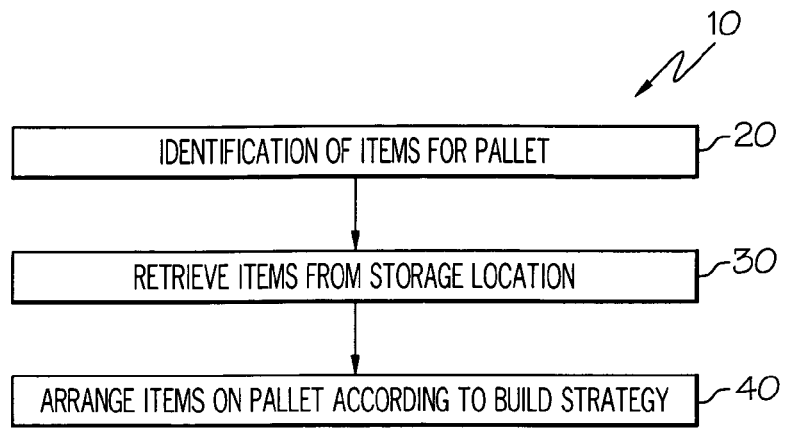
FIG. 1 is a flow diagram of the method for arranging items on a pallet in accordance with one embodiment of the present invention.

The present invention is a system and method for arranging items on a pallet in a way that allows easy sequential off-loading of the pallet when it is positioned at the proper aisle location within a store. Items or products, as used herein, are merchandise to be sold by the enterprise. An enterprise, as used herein, is a business organization. A retail enterprise is a business organization that sells to the ultimate consumers, and a wholesale enterprise is a business organization that sells items for resale (usually to retail enterprises). Examples of retail enterprises include, but are not limited to, superstores, outlet stores, department stores, pharmacies, hardware stores, novelty stores, home improvement centers, auto supply centers, and discount stores. Examples of wholesale enterprises include, but are not limited to, retail suppliers, independent distributors, and wholesalers. An enterprise may comprise a number of enterprise facilities, such as stores, that may be grouped by geographical or corporate characteristics, such as divisions. For the purposes of describing an embodiment of the present invention, this description will discuss a large retail grocery enterprise. This embodiment is merely exemplary in nature and is in no way intended to limit the invention, its application, or uses and alternatively this invention can be used in most any retail or wholesale enterprise.

In a typical grocery store, examples of departments may include a meat department, pharmacy department, grocery department, produce department, frozen foods department and the like. Departments may be subdivided into commodities to facilitate better control over the activities in the department. For example, the meat department may be subdivided into commodities such as hot dogs, bacon and the like. Commodities may be further divided into products. For example, a brand of hot dogs, such as Ballpark Franks®, of a particular style and size may be a product within the hot dog commodity. As used herein, an "item" is a unit of sale of a product.

The palletizing system and method described herein can enable stacking or loading of pallets with cases of items by store item location that allows easy predetermined placement of the pallet at the proper aisle location within a store. In other words, the present invention allows individual stores to control how their pallets are built. Pallet stacking or loading by store item location results in the sequential off-loading of the items for easy stocking of store shelves. The pallet stacking or loading is performed in accordance with a build strategy described below. In other words, the build strategy tells what approach is used in building a pallet for delivery to a store. For example, within a grocery store, items are displayed on shelves and may vary by number, width, depth and height. Each store maintains information regarding the height of each shelf, the name and type of items to be displayed on each shelf, and the order in which the items are to be arranged and in some cases the exact placement of the item on the shelf. Each store maintains this information because within a large grocery enterprise there are a number of different store layouts. When the quantity of the items falls below a certain level, the store places an order for various items that need to be replenished. The order contains the aisle position information for each of the items in the order.

Next, the order is sent to a storage location for processing. At the storage location, the items are organized into cases on one or more pallets based upon a pallet build strategy that includes the store aisle and location information for each item. After each pallet is built, a label is attached containing the number of the store aisle where the majority of the cases on the pallet belong. The pallets are then transferred onto a vehicle, typically a large trailer, for delivery to individual stores. Once the pallets arrive at the store, they are unloaded into a storage area. Each pallet is then delivered directly into the aisle indicated on the label. The location can be front, middle or back and include the left or right side of the aisle. The items on the pallet are then sequentially off-loaded for easy stocking of the store shelves. This process allows the grouping of items in a way during pallet building process, i.e. front-end, so as to reduce the labor for breaking down pallets in preparation for stocking the items at the store, i.e. back-end.

Referring now to FIG. 1, the method for arranging items on a pallet 10, contains a series of steps which are intended to allow easy sequential off-loading of the pallet when it is positioned at the proper aisle location within a store, step 20, identifying items for inclusion on the pallet, step 30, retrieving the one or more items from a storage location, and step 40, arranging the one or more items on the pallet according to a build strategy.

At step 20, one or more items are identified for inclusion on the pallet. In one example, individual stores will transmit an order for various items to a storage location. From the store order, the list of items that need to be loaded on pallets is identified. At step 30, the one or more items are retrieved from the storage location. Any suitable storage location may be used, for example, a warehouse.

At step 40, the one or more items are arranged on the pallet according to a build strategy for delivery to individual stores. In one example, the build strategy may include store location information, for example, aisle position information for each of the one or more items in the order. That is, for each of the one or more items, the store aisle position information for the store that generated the order is used to organize the items on the pallets. In one embodiment, aisle position information may include a side indicator and a spot indicator for each of the items. The side indicator may be represented by such terms as "left" or "L" and "right" or "R". The spot indicator may be represented by such terms as "front" or "F", or "middle" or "M", and "back" or "B". In one embodiment, the pallets are single aisle pallets that can be placed or spotted directly in the store aisle to minimize store travel time.

In another embodiment, the build strategy may also include order type information and item characteristic information. In one example, order type information may include the designations normal, end cap, handbill and distribution. "Normal" refers to items that belong to a designated aisle. "End cap" refers to items that belong to an end cap, i.e. the end portion of an aisle that is exposed on three sides. "Handbill" refers to a special order or emergency order, for example, a store manager realizes that a certain item was left off of the original order. "Distribution" or "Distro" refers to a special distribution of items, for example, pushouts (new products to be distributed or "pushed out" to stores), promotional items and substitute items. In one embodiment, the items are organized into cases by order type prior to loading the cases on the pallet. As a result, a pallet can have more than one order type of cases on it.

Item characteristic information may include factors such as causticity, crushability, size, shape and weight. For example, caustic items, such as bleach will not be loaded on top of non-caustic items, such as cereal and crushable or breakable items, such as bread will likewise not be loaded on a pallet with non-crushable or breakable items, such as flour. This build strategy allows each store to build pallets by store item location and order type which in turn reduces labor costs and damage to merchandise.

Figure 2:
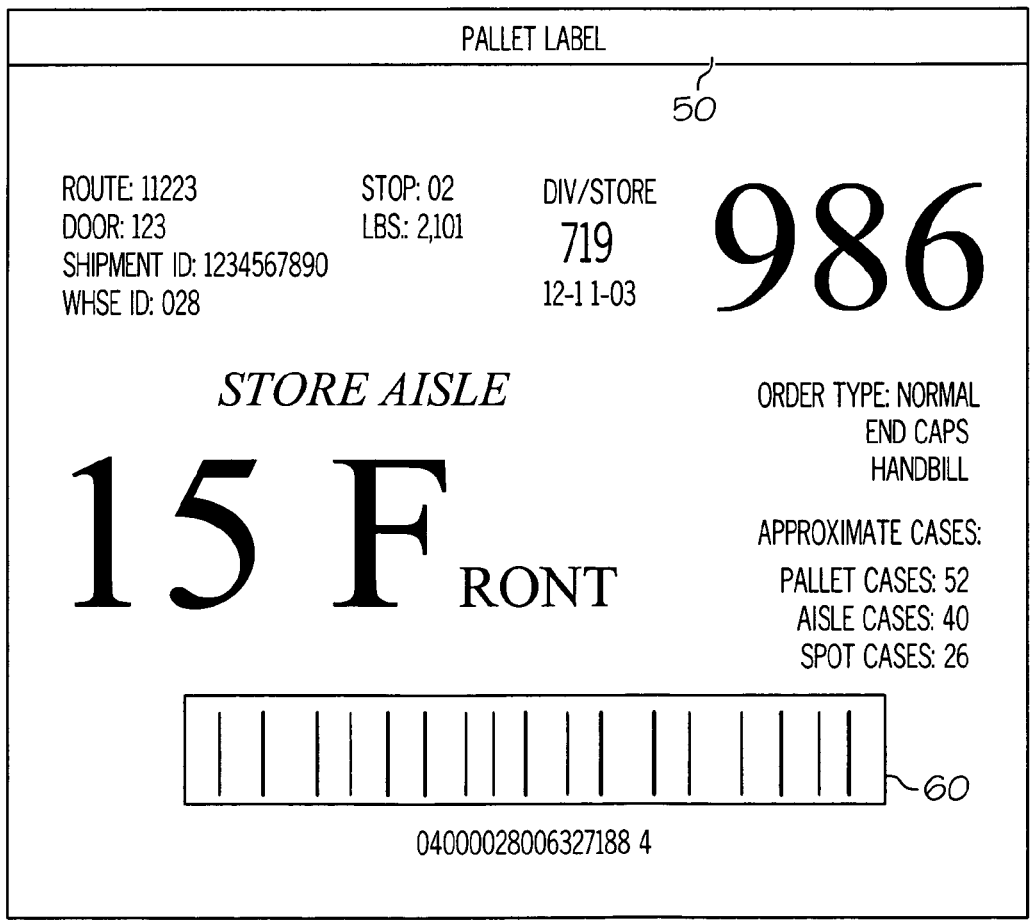
FIG. 2 is an exemplary label in accordance with one embodiment of the present invention.

In one embodiment, once the pallets are built or loaded, a label is added to each pallet. The label provides information regarding the build strategy used in loading the pallet. In addition, the label provides store employees with the aisle position information for placement of the pallet at the proper aisle location within the store. Referring now to FIG. 2, in yet another aspect, the invention relates, additionally, to attaching a label 50 to individual pallets. Generally illustrated on label 50 is text that provides information that will assist the enterprise in delivering and stocking the items on the pallet. Non-limiting examples of the type of information that is contained on label 50 include route number, stop number, door number, shipment ID, warehouse ID, division and store number, store aisle number, order type, and approximate number of cases.

The route number refers to the number assigned by a transportation routing system. The transportation routing system is an off-the-shelf software application that determines the best truck or trailer utilization for delivery to stores. The stop number refers to the number to which the store pallet belongs. For example, 1st, 2nd or 3rd stop on the route. The stop number also designates the loading sequence for the warehouse. The door number refers to the warehouse door where the trailer will be loaded. The shipment ID refers to a unique number assigned to a group of orders for a particular store, route and stop. The shipment ID may also include a bar code 60 for tracking. Bar code 60 represents the pallet identification number. In another aspect, the invention relates, additionally, to attaching a radio frequency identification tag (RFID) to pallets. The tracking device allows the warehouse to monitor the pallets delivery to the individual stores and to know all of the products located on a pallet for reporting purposes.

The warehouse ID or "whse" ID refers to the warehouse number for the particular storage location or warehouse where the order was received and processed. The division number refers to the number associated with a particular grouping of stores and the store number refers to the number for a particular store. In the exemplary label 50, the store number is in larger print than the division number. The store aisle is the number of the store aisle where a majority of the cases on the pallet belong. The store aisle may also include a spot indicator for the relative position (spot) in the aisle where the majority of the cases belong. The approximate number of cases refers to the number of cases on the pallet separated into three categories: 1) pallet cases, the total cases on the pallet, not all necessarily belonging to the aisle; 2) aisle cases, cases that belong to the designated aisle, i.e. the store aisle number; and 3) spot cases, cases that belong to the position or spot in the aisle designated as Front, Middle or Back. For example, on label 50 there are 52 total cases on the pallet, 40 of which belong to aisle 15 which means that 12 go to another part of the store. Of the 40 cases that belong to aisle 15, 26 of those belong to the Front spot of the aisle. As a result, the label 50 conveys information to the store about the pallet build strategy and the optimal location for delivery of the pallet based on the where the majority of cases belong.

Figure 3:
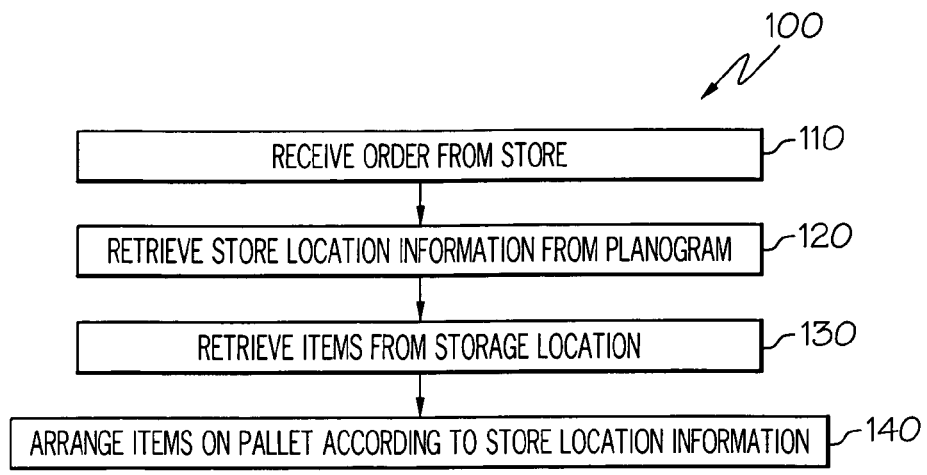
FIG. 3 is a flow diagram of the method of palletizing items in accordance with one embodiment of the present invention.

As shown in FIG. 3, another embodiment of the present invention is directed to a method of palletizing items 100 containing a series of steps which are intended to allow easy predetermined placement of the pallet at the proper aisle in a store: step 110, receiving an order of items for a store; step 120, retrieving store location information from a planogram for the items; step 130, retrieving the one or more items from a storage location; and step 140, arranging the one or more items on the pallet according to store location information.

At step 110, orders are received from individual stores for various items that need to be replenished. In one example, stores utilize an inventory system to track the actual stock levels of items in the store and an order generating application to generate the order. An example of an inventory system is Inventory Pro 4.5, commercially available from M & R Technologies, Inc. of Palm Bay, Fla. In one embodiment, handheld bar code scanners record each unit of each item as it is received at the store. Scanners are devices for sensing and reading bar codes identifying the items. One such scanner is the Econoscam™ commercially available from ID TECH® of Fullerton, Calif. A point of sale system (POS) record units of items sold. One possible POS is the BEETLE®/OnePOS, commercially available from Wincor Nixdorf, Inc. of Austin, Tex. Scanners may also be used to track units of items recorded as a loss due to shrinkage. As the items are discarded they are recorded using a scanner. The inventory system uses the data received from scanners and POS system to track the stock levels of items in the store. The inventory system generates a list of items that need to be replenished and communicates that information to the order generating application described below. In another example, order information can be generated by hand by store employees.

At step 120, the store location information for the items in the order is retrieved from a shelf management map, or planogram. Typical planograms contain item arrangement data, generally describing the items and how they are arranged on a particular or discrete store shelf. Additional details of methods and systems for using planograms can be found in U.S. patent application entitled "System and Method for Mapping of Planograms" filed on May 11, 2004, application Ser. No. 10/843,204, the content of which is hereby incorporated by reference as if fully set forth herein.

At step 130, the one or more items are retrieved from the storage location. At step 140, the one or more items are arranged on the pallet according to store location information, for example, aisle position information for each of the one or more items in the order. That is, for each of the one or more items, the store aisle position information for the store that generated the order is used to organize the items on the pallets. In one embodiment, aisle position information may include a side indicator and a spot indicator, as described above.

II. Exemplary Embodiment of Palletizing System

Figure 4:
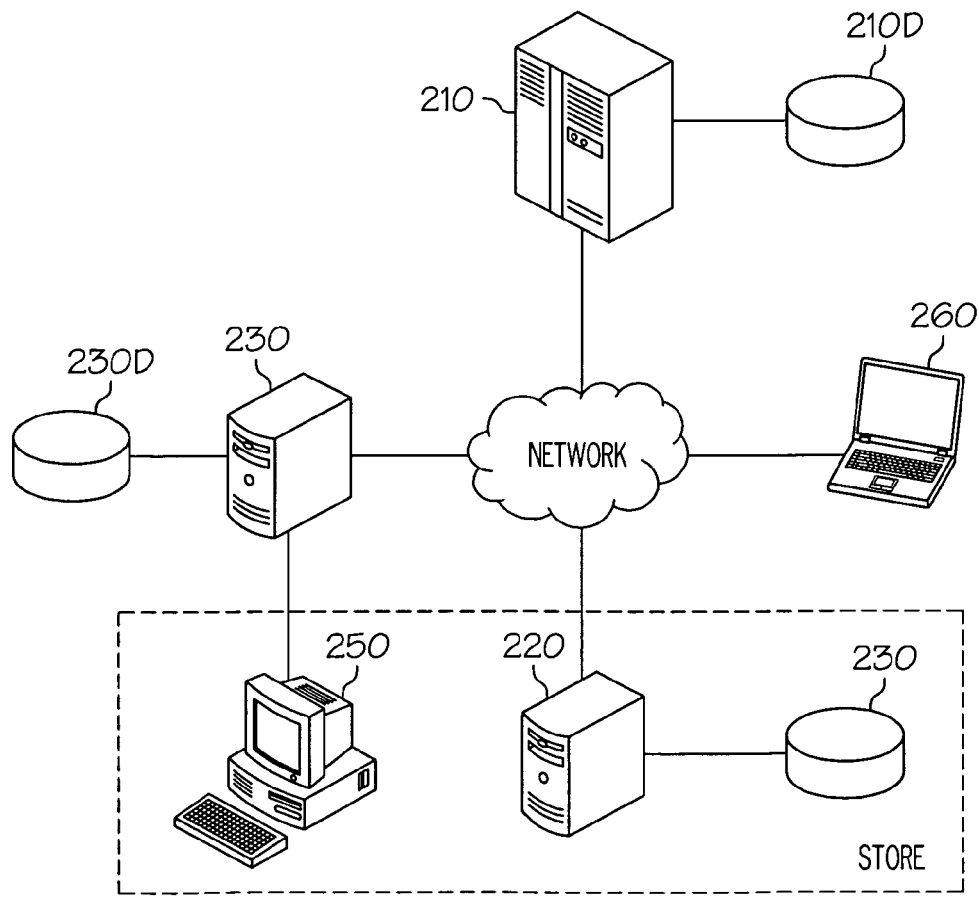
FIG. 4 is a diagrammatic view illustrating an embodiment of a palletizing system architecture in accordance with one embodiment of the present invention.

FIG. 4 is an architectural diagram illustrating an operational environment for an embodiment of the palletizing system. A network 200 is depicted in the center and represents any type of computer network, telecommunications network, or a combination thereof. In some embodiments of the palletizing system, the network 200 can be a company-wide intranet. In other embodiments, local area networks (LANs), or wide area networks (WANs), such as multiple LANs linked together by bridges, routers or similar devices, can serve as the network 200. In addition, the network 200 can include common carrier transmission lines and equipment, such as those provided by an Internet service provider (ISP), to link remote computers.

Also depicted in FIG. 4 are an enterprise server 210, a store server 220 and a warehouse server 230, which are connected to the network 200. Each of the servers 210, 220, and 230 has an associated database 210D, 220D and 230D, respectively, for storing product or service data pertinent to each organizational level of the enterprise. While not shown here, it is understood that the databases 210D, 220D and 230D could also be connected to the network and reside in separate locations from the servers 210, 220, and 230. In some embodiments, multiple servers for different organizational levels may share a database. In other embodiments, multiple databases for different organizational levels may be connected to a single server.

In one embodiment, store level application server 220 contains an order generating application for generating order information for each individual store, including aisle position information for the items contained in the order. The order information may also include end cap information for the items. In one example, when a store adjusts the order or creates a manual order, the store can mark the item as being ordered for an end cap. The order generating application will prompt the store to identify the location of the end cap by entering the aisle and location.

Enterprise level application server 210 contains an order adjustment application for making one or more adjustments to the order information. The order adjustment application is responsible to apply any store requested adjustments or modifications. In one example, if the store requests to substitute one item for another item, the order adjustment application will use the aisle and location for the original ordered item when adding the substituted item to the order. In another example, if a distribution item is added to the order, the order adjustment application will look at a like item within the order, based on commodity, to find the most likely aisle and location of the item within the store. In one embodiment, the order adjustment application also identifies the distribution items from the original ordered items in order to allow the warehouse to build a separate pallet for the distribution items.

Warehouse level application server 230 contains a pallet build application for arranging the one or more items on a pallet using the aisle position information. The pallet build application also creates viewable pallet reports displaying the items stacked on the pallet. Enterprise level application server 210 further includes a warehouse inventory application for communicating the order information to the pallet build application. In one embodiment, the warehouse inventory system can also sort the order by order type information before communicating the order information to the pallet build application. The warehouse inventory system is able to determine all products located on a specific pallet for tracking and reporting purposes.

In a store 240, there is also a computer terminal 250 which is also connected to the network 200. A personal computer 260 is also connected to the network 200 so employees who are traveling, at home or otherwise away from an enterprise facility can access the system. While one of each server, database, computer, and the like is illustrated here, this is by way of example only and other embodiments of the palletizing system may contain more or fewer of any component depicted herein.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for arranging items on a pallet comprising the steps of:
   (a) determining items to be replenished in a store using an inventory system, the inventory system communicating the items to be replenished to an order generating system comprising an order generating application running on an application server;
   (b) generating an order using the order generating system, the order including the items to be replenished determined in step (a);
   (c) identifying one or more items for inclusion on the pallet using the order generated in step (b);
   (d) retrieving the one or more items from a storage location;
   (e) retrieving store location information from a database for each of the items identified in step (c), the store location information included with the order where the store location information is different from the storage location and includes aisle position information for a store remote from the storage location, the aisle position information providing an indication of where the associated items are to be placed for consumer purchase upon arrival at the store after being removed from the storage location, the aisle position information indicating a position on an aisle the items are to be placed in addition to indicating the aisle itself; and
   (f) arranging the one or more items on the pallet according to a build strategy, where the build strategy includes the aisle position information within the store,
   wherein step (b) further comprises the step of making one or more adjustments to the order information to substitute one item for a different item after the order information is generated, wherein the order adjustment associates the aisle position information for the one item with the different item.

2. The method of claim 1, wherein the aisle position information includes a side indicator selected from the group consisting of left side and right side.

3. The method of claim 1, wherein the aisle position information includes a spot indicator selected from the group consisting of front, middle and back.

4. The method of claim 1, wherein the build strategy further includes order type information and item characteristic information.

5. The method of claim 4, wherein the order type information is selected from the group consisting of normal, end cap, handbill and distribution.

6. The method of claim 4, wherein the item characteristic information is selected from the group consisting of causticity, crushability, size, shape and weight.

7. The method of claim 1, further comprising the step of attaching a tracking device to the pallet.

8. The method of claim 7, wherein the tracking device is a Radio Frequency Identification (RFID) tag.

9. The method of claim 1, further comprising the step of attaching a label to the pallet, where the label includes aisle position information for the one or more items arranged on the pallet.

10. The method of claim 1, wherein the aisle position information is retrieved from a planogram of the store.

11. A method for arranging items on a pallet comprising the steps of:
    receiving an order for a store, where the order includes one or more items;
    retrieving store location information from a planogram saved in memory for the one or more items in the order, the store location information providing an indication of where the associated item is to be placed for consumer purchase upon arrival at the store after being removed from the storage location, the store location information indicating a position on an aisle the items are to be placed in addition to indicating the aisle itself;
    retrieving the one or more items from a storage location;
    arranging the one or more items on a pallet according to the store location information, where the store location information includes aisle position information; and
    transporting the pallet including the one or more items to the aisle within the store associated with the store location information.

12. The method of claim 11, wherein the order is automatically generated by the store based upon tracked inventory.

13. The method of claim 11, further comprising the step of attaching a label to the pallet, where the label includes aisle position information for the one or more items arranged on the pallet.

14. A computer-based system for arranging items on a pallet comprising:

an order generating application located on a store level application server that generates order information for the store, where the order information includes one or more items and aisle position information for the one or more items, the aisle position information providing an indication of where the associated items are to be placed for consumer purchase upon arrival at the store after being removed from the storage location;

an order adjustment application located on an enterprise level application server that makes one or more adjustments to the order information to substitute one item for a different item after the order information is generated, wherein the order adjustment application associates the aisle position information for the one item with the different item;

a pallet build application located on a warehouse level application server that arranges the one or more items on a pallet using the aisle position information; and a warehouse inventory application located on an enterprise level application server for communicating the order information to the pallet build application.

15. The system of claim 14, wherein the aisle position information includes a spot indicator selected from the group consisting of front, middle and back.

16. The system of claim 14, wherein the order information further includes end cap information.

17. The system of claim 14, wherein the one or more adjustments includes adding distribution items to the order information.

18. The system of claim 14, wherein the one or more adjustments includes adding handbill items to the order information.

19. The system of claim 14, wherein the one or more adjustments includes applying substitutions for out of stock items.

20. The system of claim 14, wherein the pallet build application further utilizes order type information and item characteristic information.

* * * * *

UNITED STATES PATENT AND TRADEMARK OFFICE
CERTIFICATE OF CORRECTION

| | |
|---|---|
| PATENT NO. | : 7,657,467 B2 |
| APPLICATION NO. | : 11/241723 |
| DATED | : February 2, 2010 |
| INVENTOR(S) | : Deganis et al. |

It is certified that error appears in the above-identified patent and that said Letters Patent is hereby corrected as shown below:

Title Page, Item (75) Inventors:

Correct Inventor's name "Kevin Doughtery" to -- Kevin Dougherty --

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,657,467 B2  Page 1 of 1
APPLICATION NO. : 11/241723
DATED : February 2, 2010
INVENTOR(S) : Deganis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 533 days.

Signed and Sealed this

Twenty-eighth Day of December, 2010

David J. Kappos
*Director of the United States Patent and Trademark Office*